Patented July 16, 1946

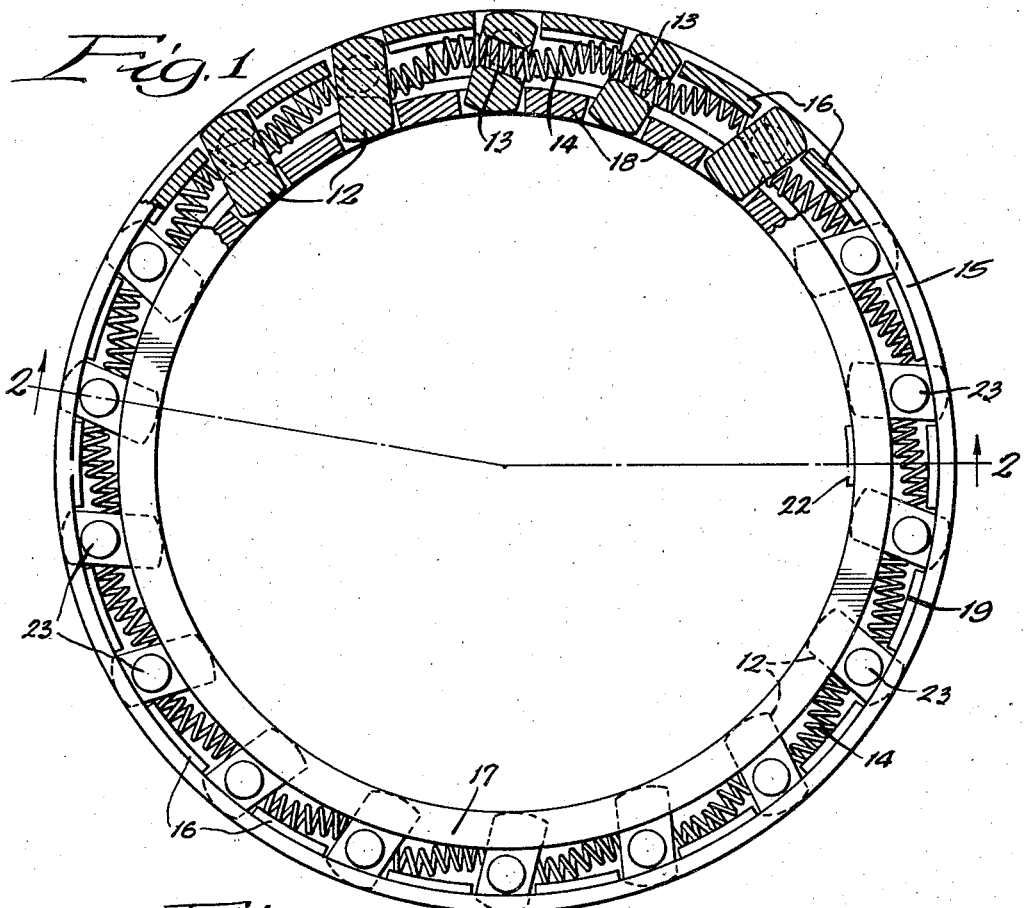
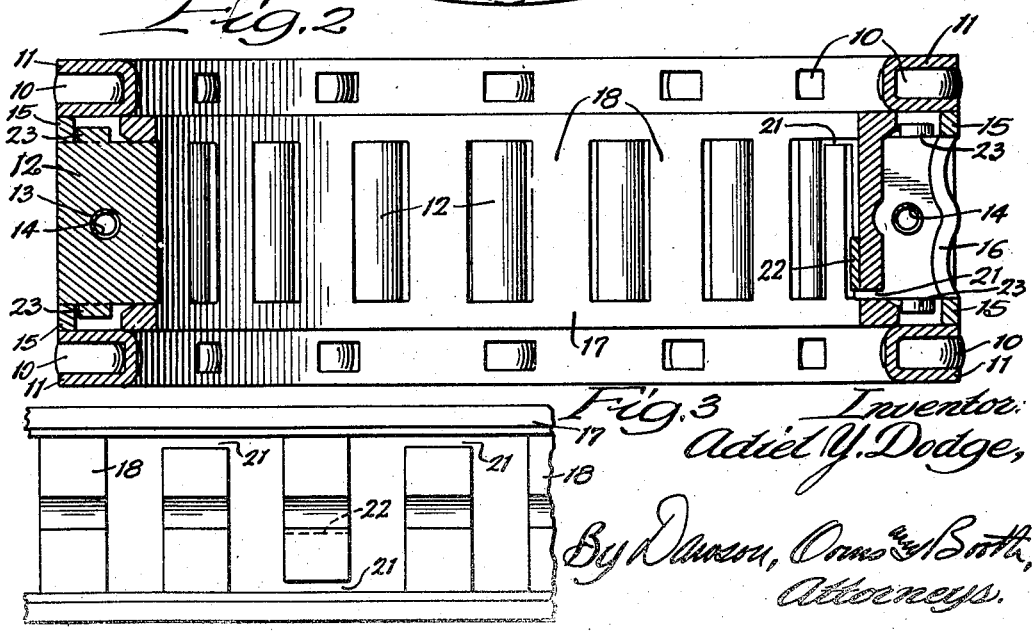

2,404,221

UNITED STATES PATENT OFFICE 2,404,221

ONE-WAY CLUTCH

Adiel Y. Dodge, Rockford, Ill.

Application July 3, 1944, Serial No. 543,288

11 Claims. (Cl. 192—45.1)

This invention relates to one-way clutches and more particularly to a combined one-way clutch and bearing construction for use with coaxial cylindrical races.

One of the objects of the invention is to provide a combined one-way clutch and bearing construction in which lubrication of the parts is maintained under all operating conditions.

Another object is to provide a combined one-way clutch and bearing construction in which bearing units mounted adjacent the clutch unit for rotation relative thereto serve to maintain lubricant in the clutch unit.

Still another object of the invention is to provide a one-way clutch in which the clutch grippers are controlled during engagement and disengagement by the frictional effect of cage parts on the races.

Still another object is to provide a clutch cage having two independently rotatable rings yieldingly engaging the inner and outer races respectively to provide a frictional drag thereon to control the grippers.

A further object is to provide a clutch cage construction in which a yielding pressure against the races is maintained by utilizing the torsional effect of the cage end rings.

The above and other objects and advantages of the invention will be more readily apparent from the following description when read in connection with the accompanying drawing, in which—

Figure 1 is a side elevation of a clutch unit with parts in section;

Figure 2 is a section of a combined clutch and bearing assembly on the line 2—2 of Figure 1; and Figure 3 is a partial elevation of the inner cage ring.

The entire assembly as seen in Figure 2, comprises two bearing units with a clutch unit mounted between them. Each of the bearing units includes a plurality of bearing rollers 10 which may be of the type more particularly described and claimed in my copending application, Serial No. 521,010 filed February 4, 1944. As shown, the rollers are relatively narrow and their ends are curved or barrelled slightly to contact the races. The rollers are supported by annular cages 11 which are U-shaped in cross section with flat sides engaging the flat ends of the rollers to support and guide them. The sides of the cages form disc like members and are of such a size as to have a close running fit with the outer race surface for a purpose to appear later.

It will be understood that the rollers have limited radial movement relative to the cages 11 so that when installed between cylindrical races the sides of the cages and the outer surfaces of the rollers will both engage the outer race surface.

A clutch unit is mounted between the two bearing units and includes a series of tiltable grippers 12 which may be constructed as more particularly described and claimed in my copending application, Serial No. 479,695 filed March 19, 1943. The grippers are tiltable into one position in which they wedge between the races to connect them drivably together and to another position in which they disengage the races so that they may turn freely relative to each other. Each of the grippers is formed with a transverse central opening 13 lying at a slight angle to its parallel faces thru which an annular coil spring 14 is threaded. The angle of the openings is such that the spring will be bent laterally by the grippers to exert a tilting couple on the grippers urging them toward their engaged position.

The several grippers are supported in a cage formed by annular inner and outer cage rings which are rotatable relative to each other. The outer cage ring as shown, comprises annular end members 15 connected by a series of spaced cross bars 16 which fit between the outer end portions of the grippers and are adapted to engage the grippers to assist in tilting them. The cross bars 16 are preferably bent as shown in Figure 2, to provide adequate clearance at their central portions for the spring 14 and to clear the outer race throughout the major portion of their length.

The inner ring is similarly formed with two annular side members 17 connected by a series of spaced cross bars 18 which fit between and are adapted to engage the inner ends of the grippers to assist in tilting them.

In order to control the grippers on a reversal of torque in the clutch to produce a more rapid and positive engagement and disengagement, the cage rings frictionally engage the races respectively. To obtain frictional engagement between the outer ring and the outer race, the ring is split as indicated at 19 thru one of the cross bars and is expanded to a normal size slightly larger than the diameter of the outer race. In assembling the clutch into the race, the ring is squeezed in to fit into the race and then expands against it so that the rings 15 and the central parts of the cross bars will press resiliently against the outer race. In this way a friction drag is produced between the outer cage ring and the outer race tending to turn the ring with the race.

Friction drag between the inner ring and the race is produced by severing the ends of preferably three of the cross bars as indicated at 21. As shown in Figure 3 the cross bars are cut adjacent the rings 17 and are alternated from one to the other of the rings. The central cross bar carries a friction block 22 which may be of bronze or the like to bear against the inner race. With this construction the side member 17 which supports the central cross bar 18 carrying the friction block acts as a torsion spring resiliently to hold the friction block in engagement with the inner race surface.

In operation when the outer race tends to turn counter-clockwise relative to the inner race as seen in Figure 1, the outer cage will also tend to turn counter-clockwise. The cross bars 16 will thus engage the right sides of the grippers while the cross bars 18 of the inner ring engage their left sides so that the grippers will be tilted counter-clockwise about their own axes. In this position the grippers will engage the races drivably to connect them. Upon a reversal of torque the bars 16 will engage the outer left sides of the grippers while the bars 18 engage the inner right sides tending to tilt the grippers clockwise out of engagement with the races. The spring 14 tends at all times to tilt the grippers into engaging position and during the last described operation the action of the cage rings tilts the grippers against the spring substantially to offset the spring tilting force. The outer race may, therefore, turn clockwise with a minimum of drag relative to the inner race on the bearings 10 during overrunning and the grippers will connect the races quickly and evenly in the driving direction.

The grippers are held assembled in the cage when the cage is not in place between the races by the spring 14. To remove undue strain from this spring when the parts are disassembled, the grippers are provided with projections 23 at their opposite ends fitting loosely between the rings 15 and 17. The projections are so located on the grippers that they will engage the outer ring members 15 or inner ring member 18 when the grippers tend to fall thru the slots in the cage rings. When the clutch unit is not between the races the projections 23 support the grippers between rings 15 and 17 to prevent damage to the spring 14.

In operating clutch units of the type shown, proper lubrication of the parts, particularly the inner race, during overrunning, is very important to prevent undue wear on the gripper ends and on the races. The normal tendency of lubricant fed into the clutch is to flow out along the outer race away from the clutch parts. According to the present invention, excessive flow of lubricant away from the clutch parts is prevented by bearing cages 11 which engage the outer race and provide lubricant dams holding the lubricant in the clutch, causing the flow of lubricant to move along the inner race and escape between the inner race and the cage 18. Thus, with a relatively small supply of lubricant to the clutch, adequate lubrication of the inner race and gripper surfaces and between the cage rings and the races is insured.

While one embodiment of the invention has been shown and described in detail herein, it will be understood that this is illustrative only and not intended as definition of the scope of the invention, reference being had for this purpose to the appended claims.

What is claimed is:

1. A combined one-way clutch and bearing construction adapted to operate between coaxial cylindrical races comprising a series of bearing rollers between the races, an annular cage supporting the rollers having an annular disc like portion fitting closely against the outer race, a series of tiltable grippers between the races, an annular cage supporting the grippers lying adjacent but rotatable relative to the bearing cage, the disc like portion serving as a lubricant dam to hold lubricant around the grippers.

2. A combined one-way clutch and bearing construction adapted to operate between coaxial cylindrical races comprising two axially spaced annular series of bearing rollers between the races, annular cages for the bearing rollers each having an annular disc like portion fitting closely against the outer race, a series of tiltable grippers axially between the two series of bearings, and an annular cage supporting the grippers lying between and rotatable relative to the bearing cages, the disc like portions of the bearing cages forming lubricant dams to hold lubricant around the grippers.

3. A combined one-way clutch and bearing construction adapted to operate between coaxial cylindrical races comprising two axially spaced annular series of bearing rollers between the races, annular cages for the bearing rollers each having an annular disc like portion fitting closely against the outer race, a series of tiltable grippers axially between the two series of bearings, and an annular cage supporting the grippers lying between and rotatable relative to the bearing cages, the gripper cage including inner and outer cage rings rotatable relative to each other and having resilient portions frictionally engaging the inner and outer races respectively, the cage rings having cross members engaging the grippers adjacent their opposite ends whereby relative rotation of the rings tilts the grippers, the disc like portions of the bearing cages forming lubricant dams to hold lubricant around the cage rings and grippers.

4. A one-way clutch construction adapted to operate between coaxial cylindrical races comprising a series of tiltable grippers, an outer cage ring having a series of cross bars fitting between and engageable with the outer ends of the grippers, an inner cage ring having a series of cross bars lying between and engageable with the inner ends of the grippers, one of the rings being split and resiliently biased toward the adjacent race frictionally to engage it, and means on the other ring yieldingly engaging its adjacent race.

5. A one-way clutch construction adapted to operate between coaxial cylindrical races comprising a series of tiltable grippers, an outer cage ring having a series of cross bars fitting between and engageable with the outer ends of the grippers, an inner cage ring having a series of cross bars lying between and engageable with the inner ends of the grippers, one of cross bars having a free end portion yieldingly engaging the adjacent race to create a friction drag thereon.

6. A one-way clutch construction adapted to operate between coaxial cylindrical races comprising a series of tiltable grippers, an outer cage ring having a series of cross bars fitting between and engageable with the outer ends of the grippers, an inner cage ring having a series of cross bars lying between and engageable with the inner ends of the grippers, the outer ring being split and resiliently expanded into engagement with the outer race, and means on the inner ring yieldingly engaging the inner race to create a friction drag thereon.

7. A one-way clutch construction adapted to operate between coaxial cylindrical races comprising a series of tiltable grippers, and inner and outer cage rings each including annular end members connected by cross bars lying between the grippers, the cage rings being rotatable relative to each other, and a cross bar on one of the rings being disconnected from one end member and resiliently biased into frictional engagement with the adjacent race.

8. A one-way clutch construction adapted to operate between coaxial cylindrical races comprising a series of tiltable grippers, and inner and outer cage rings each including annular end members connected by cross bars lying between the grippers, the cage rings being rotatable relative to each other, and a cross bar on one of the rings being disconnected from one end member and a friction block connected to the free end of said one of the cross bars and frictionally engaging the adjacent race.

9. A one-way clutch construction adapted to operate between coaxial cylindrical races comprising a series of tiltable grippers, and inner and outer cage rings each including annular end members connected by cross bars lying between the grippers, the cage rings being rotatable relative to each other, at least three adjacent cross bars on one of the rings being disconnected from one or the other of the end members, and a friction block on the free end of an intermediate one of the last named cross bars frictionally engaging the adjacent race.

10. A one-way clutch construction adapted to operate between coaxial cylindrical races comprising a series of tiltable grippers, and inner and outer cage rings each including annular end members connected by cross bars lying between the grippers, the cage rings being rotatable relative to each other, the outer ring being split and resiliently biased into engagement with the outer race, at least three of the cross bars on the inner ring being disconnected from one or the other of the end members, and a friction block carried by an intermediate one of the last named cross bars adjacent its free end and engaging the inner race.

11. A one-way clutch construction adapted to operate between coaxial cylindrical races comprising a series of tiltable grippers, and inner and outer cage rings each including annular end members connected by cross bars lying between the grippers, the cage rings being rotatable relative to each other, the grippers having circumferentially extending openings therethrough, an annular coil spring extending through the openings and lying radially between the cross bars on the inner and outer rings, and projections on the ends of the grippers lying between the annular end members on the inner and outer rings to limit radial movement of the grippers relative to the rings.

ADIEL Y. DODGE.